(12) United States Patent
Hwang

(10) Patent No.: US 7,779,046 B2
(45) Date of Patent: Aug. 17, 2010

(54) WEB SERVER AND METHOD TO PROVIDE WEB-PAGES TO MANAGE DEVICES

(75) Inventor: Ki-young Hwang, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 481 days.

(21) Appl. No.: 11/705,442

(22) Filed: Feb. 13, 2007

(65) Prior Publication Data

US 2008/0010369 A1    Jan. 10, 2008

(30) Foreign Application Priority Data

Jul. 4, 2006    (KR)    ...................... 10-2006-0062654

(51) Int. Cl.
*G06F 7/00*    (2006.01)
*G06F 15/16*    (2006.01)

(52) U.S. Cl. .................. 707/803; 707/802; 709/223; 709/219

(58) Field of Classification Search ................. 709/223, 709/219; 707/100
See application file for complete search history.

(56) References Cited

U.S. PATENT DOCUMENTS

| 7,072,052 B1* | 7/2006 | Tanahashi et al. ............ 358/1.1 |
| 7,408,657 B2* | 8/2008 | Suzuki et al. ............... 358/1.13 |
| 2006/0047620 A1* | 3/2006 | Branson et al. ................. 707/1 |
| 2006/0092861 A1* | 5/2006 | Corday et al. ................ 370/256 |
| 2006/0279781 A1* | 12/2006 | Kaneko ....................... 358/1.15 |
| 2009/0019141 A1* | 1/2009 | Bush et al. ................... 709/223 |

* cited by examiner

*Primary Examiner*—Etienne P LeRoux
*Assistant Examiner*—Cindy Nguyen
(74) *Attorney, Agent, or Firm*—Stanzione & Kim LLP

(57) ABSTRACT

A web server and a method to provide web-pages to manage devices. A storage stores data for a web-page setting attributes and attribute values related to at least one device. A web-page generator generates a basic web-page based on the stored data of the web-page if to display of the web-page is requested from a user terminal. A communicator transmits the generated basic web-page to the user terminal. A server controller controls the web-page generator to generate a first web-page to display at least one attribute and attribute values of the at least one attribute on the basic web-page displayed on the user terminal. Thus, only attributes and attribute values, which can be supported by a device, can be displayed on a user interface (UI) screen. As a result, a user can easily write a workform.

24 Claims, 12 Drawing Sheets

FIG. 5

```
<?xml version="1.0" encoding="UTF-8"?>
<Workform>
 <STWF1_General GUID="{CD42B80A-2AF6-4f88-B494-50291EEB8CAB}">
  <Param name="WFName" TYPE="STRING" CONFIG="TRUE" VISIBLE="TRUE" EDITABLE="TRUE" OPTIONAL="FALSE" MAXCHAR="64">
   <label>Workflow Name</label>
   <value> Defualt WF</value>
  </Param>
  <Param name="Device" TYPE="STRING" MAXCHAR="255">
   <label>Device Name</label>
   <value>105.64.222.254</value>
  </Param>
  <Param name="WFVersion" TYPE="STRING" MAXCHAR="64">
   <value>1.0</value>
...
```

WEB SERVER AND METHOD TO PROVIDE WEB-PAGES TO MANAGE DEVICES

CROSS-REFERENCE TO RELATED APPLICATIONS

This application claims priority under 35 U.S.C. §119(a) from Korean Patent Application No. 2006-62654, filed on Jul. 4, 2006, in the Korean Intellectual Property Office, the entire disclosure of which is hereby incorporated by reference.

BACKGROUND OF THE INVENTION

1. Field of the Invention

The present general inventive concept relates to a web server and a method to provide web-pages to manage devices, and more particularly, to a web server and a method to provide web-pages to manage devices by which only attributes and attribute values of the attributes supported by the devices can be displayed on a user interface (UI) screen so that a user can easily write a workform.

2. Description of the Related Art

A network printing system is a system in which a plurality of user terminals share a plurality of image forming devices through a network. A user requests operations, which are related to forming of an image, of a desired one of the plurality of image forming devices. The user also logs into a user terminal and a web server through the network to perform operations of managing the image forming device. In other words, the user sets attribute values of various attributes provided from the image forming device through a user interface (UI) screen provided from the web server, and the web server provides the set attribute values of the various attributes to the image forming device.

FIG. 1 is a view illustrating a conventional UI screen provided from a conventional web server so as to manage an image forming device. Referring to FIG. 1, if a user logs into the conventional web server through a user terminal and then enters a mode for managing the image forming device, the web server provides the UI screen of FIG. 1 for managing the image forming device. The UI screen includes a text input box 1, a previous screen box 3, and a next screen box 5. The text input box 1 is used to input attribute values of attributes from the image forming device and displayed on the UI screen for each function.

Referring to FIG. 1, the text input box 1 is displayed on the UI screen so as to set attribute values of a resolution to be used during formation of an image. If the user inputs a desired resolution into the text input box 1 and then clicks on the next screen box 5, a next screen is displayed. Another attribute (e.g., contents related to a paper size) is displayed on the next screen. If attribute values of all of the attributes are completely input, the web server maps the input attribute values on each of the attributes and stores the mapped attribute values in a database (DB).

However, if the image forming device is managed through the conventional UI screen provided from the conventional web server, the user must manually input the attribute values of all of the attributes one by one. Thus, it is complicated to manage the image forming device, and a large amount of time is required to manage the image forming device. In particular, since the conventional UI screen provided from the web server is used to set the attribute values of all of the attributes, the user is required to set an attribute value for an attribute the user does not desire to set.

If attribute values of each of the attributes are input as texts, and the user fails to check a characteristic of each of the attributes, the user has difficulty in inputting correct attribute values. As a result, the web server cannot provide an easy access method to the user. For example, the image forming device generally supports resolutions of 300 dpi, 600 dpi, and the like on a resolution input screen. However, if the user does not know such attribute values, the user has difficulty in inputting a correct desired resolution.

SUMMARY OF THE INVENTION

The present general inventive concept provides a web server and a method to provide web-pages to manage devices by which a user can minimize errors in inputting attributes of the devices about which the user may not accurately know at a time to set attributes of the devices and to solve a problem of manual input of the attributes.

The present general inventive concept also provides a web server and a method to provide web-pages to manage devices by which only attributes and attribute values of the attributes supported by the devices can be displayed on a user interface (UI) screen, such as a web-page, so that a user may easily write workforms to manage the devices.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept are achieved by providing a web server to provide web-pages to manage devices, including a storage to store data of a web-page to set attributes and attribute values related to at least one device, a web-page generator to generate a basic web-page based on the stored data of the web-page if displaying of the web-page is requested from a user terminal, a communicator to transmit the generated basic web-page to the user terminal, and a server controller to control the web-page generator to generate a first web-page to display at least one attribute and attribute values of the at least one device on the basic web-page displayed on the user terminal.

The storage may store the attribute values of each of the attributes, which can be supported by the at least one device, at least one by one, and the web-page generator may generate the first web-page to display the attribute values of each of the attributes stored in the storage, wherein the first web-page displays the attribute values on an each attribute basis.

The server controller may control the communicator and the storage to receive the attribute values of each of the attributes from the at least one device and update the stored attribute values.

The server controller may periodically receive the attribute values of each of the attributes from the at least one device.

The web server may further include a workform writer to write a new workform comprising the attribute values of each of the attributes which are completely set through the first web-page displayed on the user terminal; and a workform storage to store the written new workform.

The web server may further include a parser to parse the stored new workform if editing of the stored new workform is requested from the user terminal, wherein the server controller controls the web-page generator and the communicator to generate a second web-page to display the parsed new workform and provide the second web-page to the user terminal and then if at least one attribute value of the new workform displayed on the user terminal is changed, controls the workform writer to re-write a workform reflecting the changed attribute value.

The storage stores an image necessary to generate the web-page using a plug-in method.

An image necessary to generate the web-page may be written to be dragged and dropped on the web-page displayed on the user terminal.

The new workform may be written in an XML (eXtensible Markup Language) format.

The foregoing and/or other aspects and utilities of the present general inventive concept are also achieved by providing a method of providing web-pages to manage devices, including storing data of a web-page to set attributes and attribute values related to at least one device in a web server, generating a basic web-page based on the stored data of the web-page if displaying of the web-page is requested from a user terminal, transmitting the generated basic web-page to the user terminal, generating a first web-page to display at least one attribute and attribute values of the at least one device on the basic web-page displayed on the user terminal, and writing a new workform comprising the set attribute values of each of the attributes if the attribute values of each of the attributes are set through the first web-page displayed on the user terminal.

The first web-page to display the attribute values of each of the attributes, which can be supported by the at least one device, may be generated.

The method may further include storing the written new workform.

The method may further include parsing the stored new workform if editing of the new workform is requested from the user terminal, and generating a second web-page to display the parsed new workform and providing the second web-page to the user terminal.

The method may further include re-writing a workform reflecting the changed attribute value if the second web-page is displayed on the user terminal, and then at least one attribute value of the new workform is changed on the second web-page.

The foregoing and/or other aspects and utilities of the present general inventive concept are also achieved by providing a method to generate user interfaces to manage a plurality of devices, the method including storing attribute data and attribute values of each of the plurality of devices and workforms corresponding to the attribute data and attribute values in a server, generating a basic user interface to display the stored data and transmitting the basic user interface to a user terminal, generating a first user interface to display at least one attribute and corresponding attribute values and request one of a signal to set the at least one attribute and, corresponding attribute values and a signal to edit the workforms corresponding to the at least one attribute data and corresponding attribute values, and writing a new workform comprising the set of attribute values of each of the attributes if the attribute values of each of the attributes are set through the first user interface.

The method may further include editing the workform corresponding to at least one attribute and corresponding attribute values and storing the editing workform if the signal is to edit the workform, parsing the stored edited workform, and generating a second user interface to display the parsed edited workform.

The user interface may be a web-page.

The method may further include storing the set at least one attribute data and attribute values of the plurality of devices.

The foregoing and/or other aspects and utilities of the present general inventive concept are also achieved by providing a computer readable recording medium comprising computer readable codes to provide web-pages to manage devices, including storing data of a web-page to set attributes and attribute values related to at least one device in a web server, generating a basic web-page based on the stored data of the web-page if displaying of the web-page is requested from a user terminal, transmitting the generated basic web-page to the user terminal, generating a first web-page to display at least one attribute and attribute values of the at least one device on the basic web-page displayed on the user terminal, and writing a new workform comprising the set attribute values of each of the attributes if the attribute values of each of the attributes are set through the first web-page displayed on the user terminal.

The foregoing and/or other aspects and utilities of the present general inventive concept are also achieved by providing a web server to manage a plurality of devices, including a storage unit to store a plurality of attribute and attribute values corresponding to the plurality of devices, and a web-page generator to generate a first webpage to display the stored plurality of attribute and attribute values of at least one of the plurality of devices, and to generate one of a web-page to allow a user to enter attribute values for the at least one of the plurality of devices and a web-page to allow a user to edit the attribute and attribute values corresponding to the at least one of the plurality of devices.

The entered attribute values and/or the edited attribute and attribute values may be stored in the storage unit.

The storage unit may periodically update the attributes and/or attribute values of the plurality of devices.

The web server may further include a workform writer to write a new workform corresponding to the entered attribute values of the web-page, and a workform storage unit to store the workform.

The web server may further include a workform writer to write a new workform corresponding to the edited attributes and/or attribute values of the web-page, and a workform storage unit to store the workform.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 5 is a view illustrating an example of a workform written by a workform writer illustrated in FIG. 4;

DETAILED DESCRIPTION OF THE PREFERRED EMBODIMENTS

Figure 1:
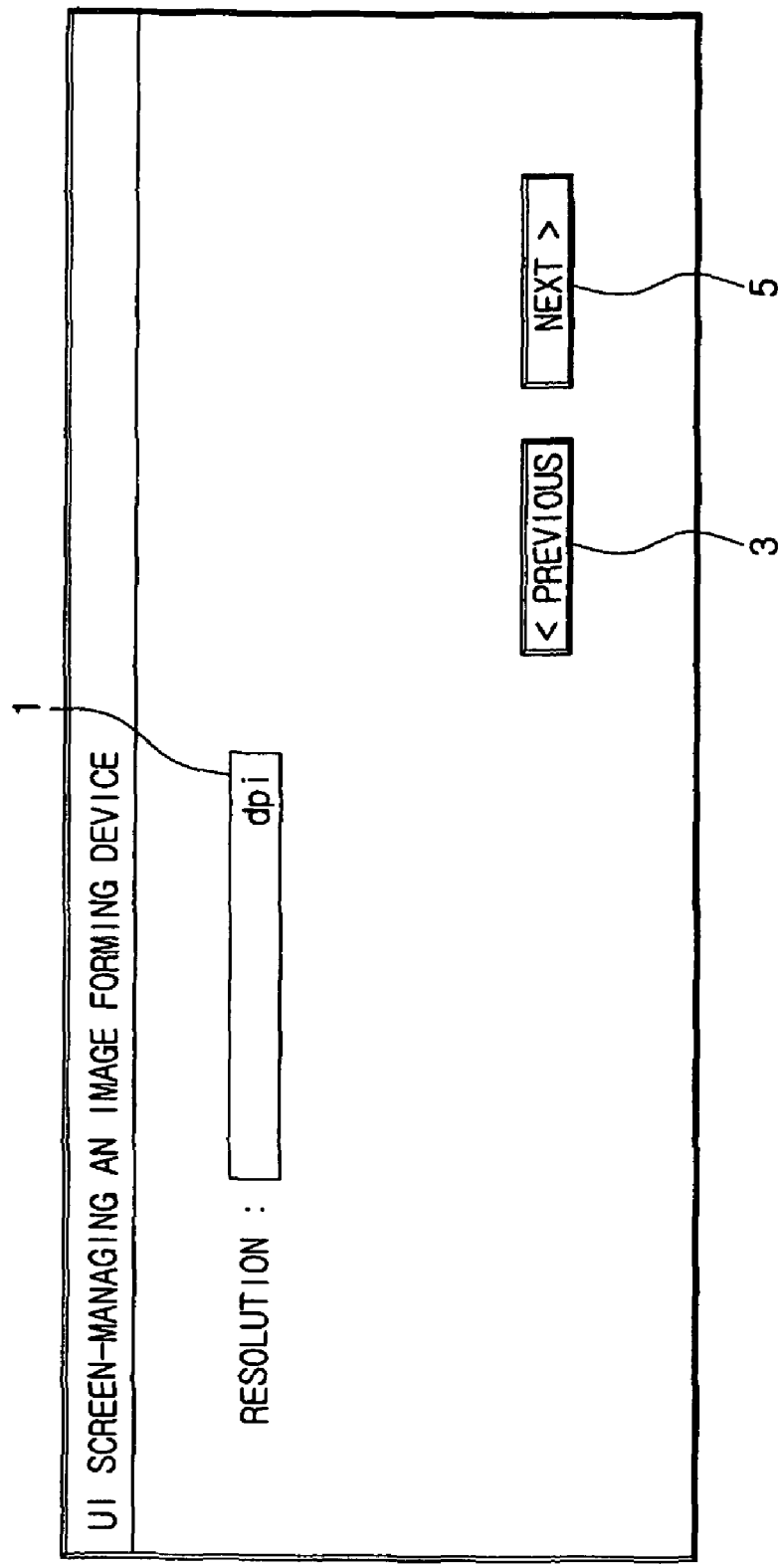
FIG. 1 is a view illustrating a user interface (UI) screen provided from a conventional web server for managing an image forming device.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
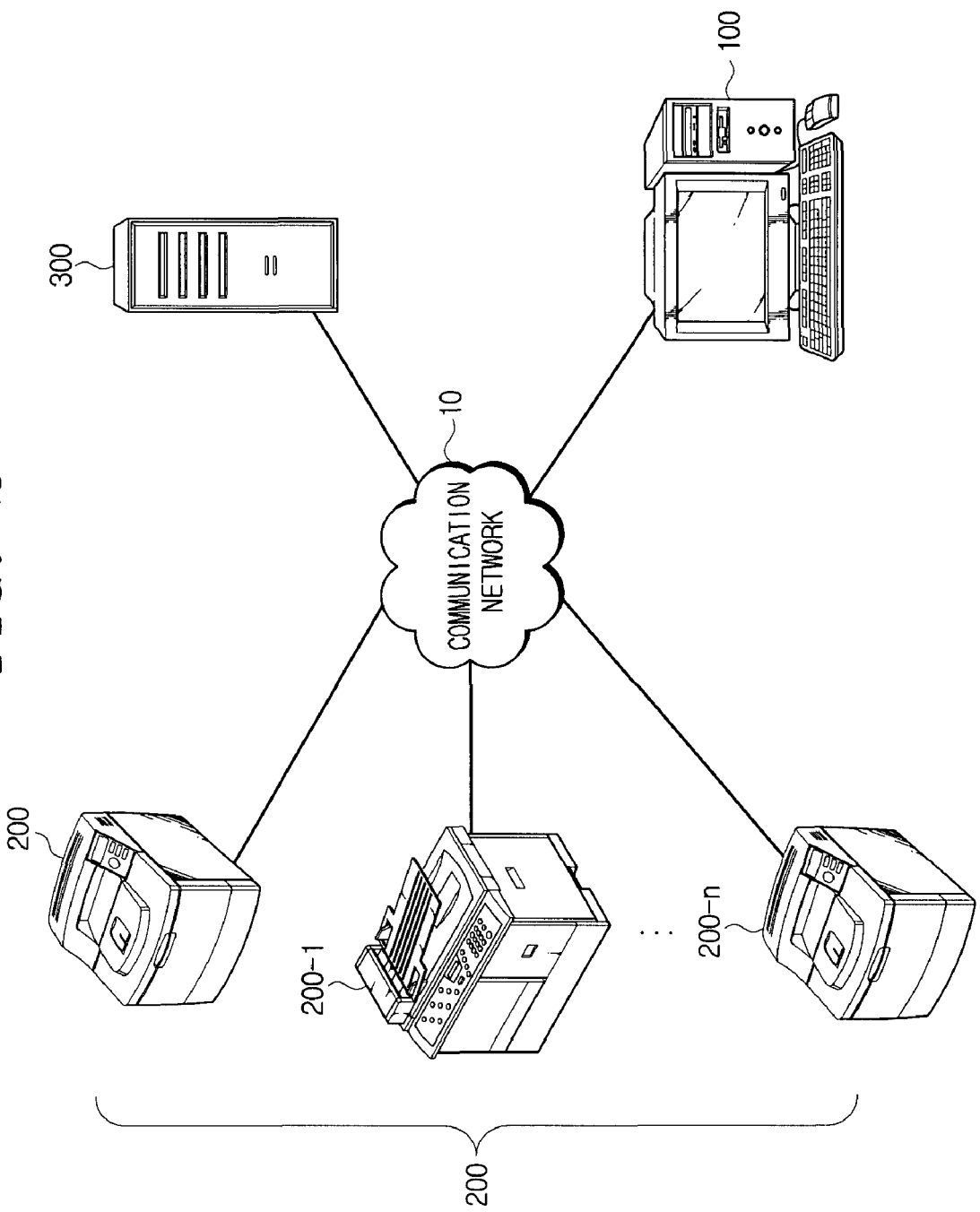
FIG. 2 is a schematic view illustrating a web system to manage devices according to an embodiment of the present general inventive concept.

FIG. 2 is a schematic view illustrating a web system to manage devices according to an embodiment of the present general inventive concept. Referring to FIG. 2, the web system may include a user terminal 100, plurality of devices 200 (200-1 through 200-n), and a web server 300.

The web server 300 provides a user interface (UI) screen to manage works and attributes supported by the plurality of devices 200 and is connected to the user terminal 100 and the plurality of devices 200 through a communication network 10 so as to communicate with the user terminal 100 and the plurality of devices 200. While in FIG. 2 the web server 300 may communicate with the user terminal 100, the present general inventive concept is not limited thereto, and the web server 300 may also communicate with a plurality of user terminals.

The user terminal 100 may be a device, such as, a personal computer (PC), a personal digital assistant (PDA), a laptop, or the like. A user may log into the web server 300 through a web browser installed in the user terminal 100 and generate or edit a workform using the UI screen, such as, a web-page. The generated or edited workforms may be stored in the web server 300. Alternatively, a plurality of workforms written by each user may be stored in the web server 300.

The workform is provided to the web server 300 so as to perform various works using various functions of the plurality of devices 200 and includes all types of information necessary to perform a series of works. Here, the workform may be written in an eXtensible Markup Language (XML) format. For example, the workform may include a plurality of pieces of information regarding a device to perform a work, an order of processing the work, work conditions, etc. If the user uses the stored workform, the user may select one of a plurality of pre-defined workforms so that works are automatically performed using the plurality of devices 200 without having to set work conditions whenever the same works are performed.

The web server 300 may store log-on information (e.g., IDs and passwords) of users pre-registered to log onto the web server 300 and the plurality of workforms set for each user. If the user logs onto the web server 300 through the user terminal 100, the web server 300 may authenticate the user using the stored log-on information.

The web server 300 also may allow the user, who has been completely authenticated, to set or edit a workform. Here, the web server 300 can write the workform using a web language, such as, for example, an XML. If the user selects a workform through a web-page provided from the web server 300, the web server 300 displays the selected workform on the web-page.

The plurality of devices 200 are devices in which programs designed to communicate with the web server 300 are installed and may be various types of electronic devices. For example, a facsimile to transmit a fax, a scanner to scan a document, a copier to copy a document, a multifunction peripheral having functions of existing printer, facsimile, scanner, copier, etc., a home appliance, a communication device, and the like.

If the at least one or more of the plurality of devices 200 receive the workform selected by the user from the web server 300, the plurality of devices 200 perform works based on the workform. For example, if a work requested by the user is "Scan to Mail" and the selected workform has work conditions to scan a document at a resolution of 300 dpi and to transmit the scanned image to an external e-mail address, the at least one or more of the plurality of devices 200 perform the work "Scan to Mail" corresponding to the work conditions set in the workform.

The communication network 10 may be established by a cable connected to a general parallel port, a cable connected to a universal serial bus (USB) port, an Internet network established by a hub and a local area network (LAN), or the like.

For convenience and brevity of the detailed description, the web server 300 will be described as a host computer in which a management program to manage the plurality of devices 200 is installed, the device 200 will be described as an image forming device, and the user terminal 100 will be described as a user computer. However, the present general inventive concept is not limited thereto.

Figure 3:
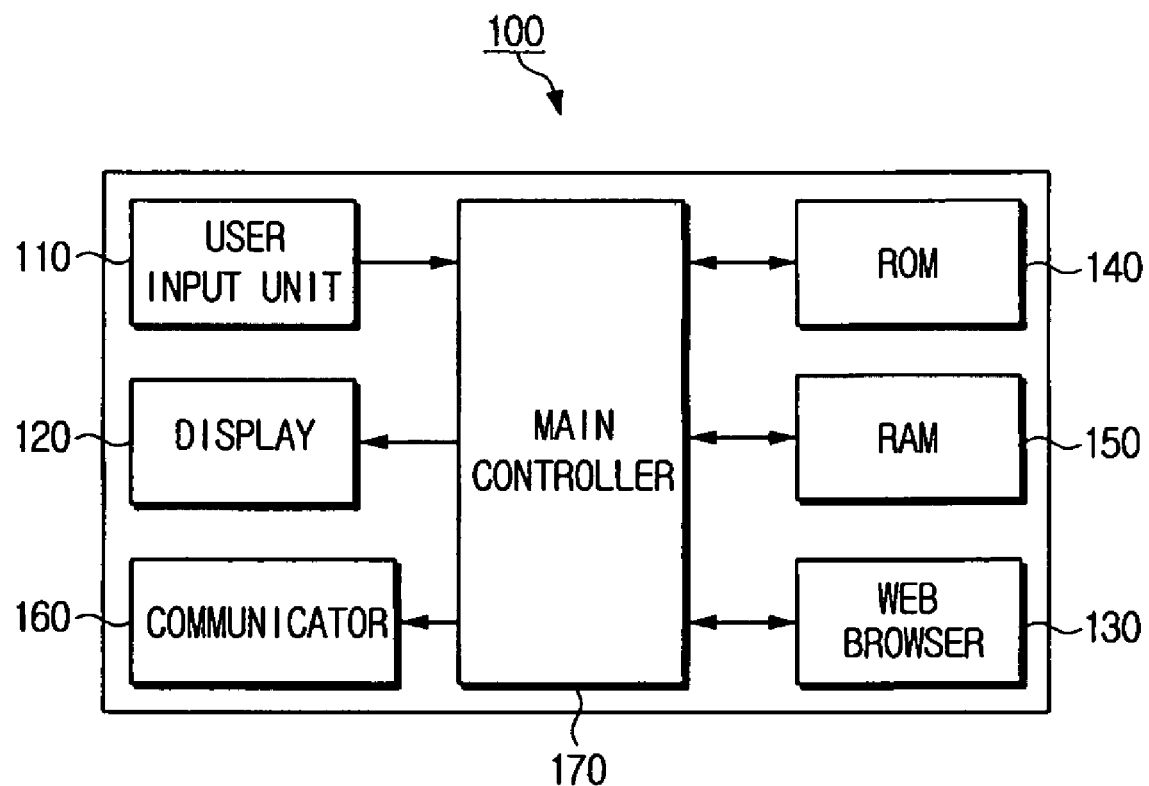
FIG. 3 is a block diagram illustrating a user terminal illustrated in FIG. 2.

FIG. 3 is a block diagram illustrating an exemplary user terminal 100 illustrated in FIG. 2, according to an embodiment of the present general inventive concept. Referring to FIGS. 2 and 3, the user terminal 100 can be connected to the web server 300 and may include a user input unit 110, a display 120, a web browser 130, a read only memory (ROM) 140, a random access memory (RAM) 150, a communicator 160, and a main controller 170. Blocks of the user terminal 100 unrelated to the present general inventive concept will be omitted for convenience, and only one device 200 of the plurality of devices 200 will be described as an example herein.

The user input unit 110 may be a user interface, such as, a keyboard or a mouse, and may output a signal to select and request functions supported by the user terminal 100. In particular, a user logs into the web server 300 through the user input unit 110 and writes or edits a workform related to a work provided from the device 200.

The display 120 may display a screen corresponding to a signal provided from the main controller 170, an operation status of the user terminal 100, or a web-page to write the workform, wherein the web-page is provided from the web server 300. The display 120 may be realized by any type of display, such as, as a liquid crystal display (LCD), a cathode ray tube (CRT), or the like.

The web browser 130 outputs a signal to request a web-page to the web server 300 and the web browser 130 may be a web browser, such as, EXPLORER. If the user manipulates the user input unit 110 to drive the web browser 130 and then inputs a web path of the web server 300, the communicator 160 executes logging into the web server 300 corresponding to the input web path. If the user logs into the web server 300, the user can be authenticated and can write a desired workform through the web-page provided from the web server 300 or can edit a pre-written workform.

The ROM 140 can store various control programs necessary to realize functions of the user terminal 100, and the RAM 150 can store various types of data generated during an operation of the user terminal 100. For example, the ROM 140 may store programs such as a WINDOWS operating system to drive the user terminal 100, an EXPLORER to drive the web browser 130, etc. Also, the RAM 150 can store data of a web-page to be browsed by the web browser 130. The stored data of the web-page is data of a web-page to write a workform and may include a plurality of images written in a compatible language, such as a Java Script format, wherein the web-page is transmitted from the web server 300.

The communicator 160 can transmit a log-in signal corresponding to the web path input into the web-page to the web server 300 and may receive a plurality of web-pages from the web server 300. For this purpose, the communicator 160 may be realized as a network interface card (NIC) which can communicate with the web server 300 and includes a port to which a LAN cable is connected.

The main controller 170 can control the overall operation of the user terminal 100 using the various stored control programs. For Example, if driving of the web browser 130 is requested from the user input unit 110, the main controller 170 can execute the web browser 130 to display an initial web-page on the display 120. Also, if the web path of the web server 300 is input from the user input unit 110, the main controller 170 can control the communicator 160, the web browser 130, and the display 120 to log into the web server 300, receive a plurality of web pages, including a basic web-page, from the web server 300, and display the plurality of web-pages.

Figure 4:
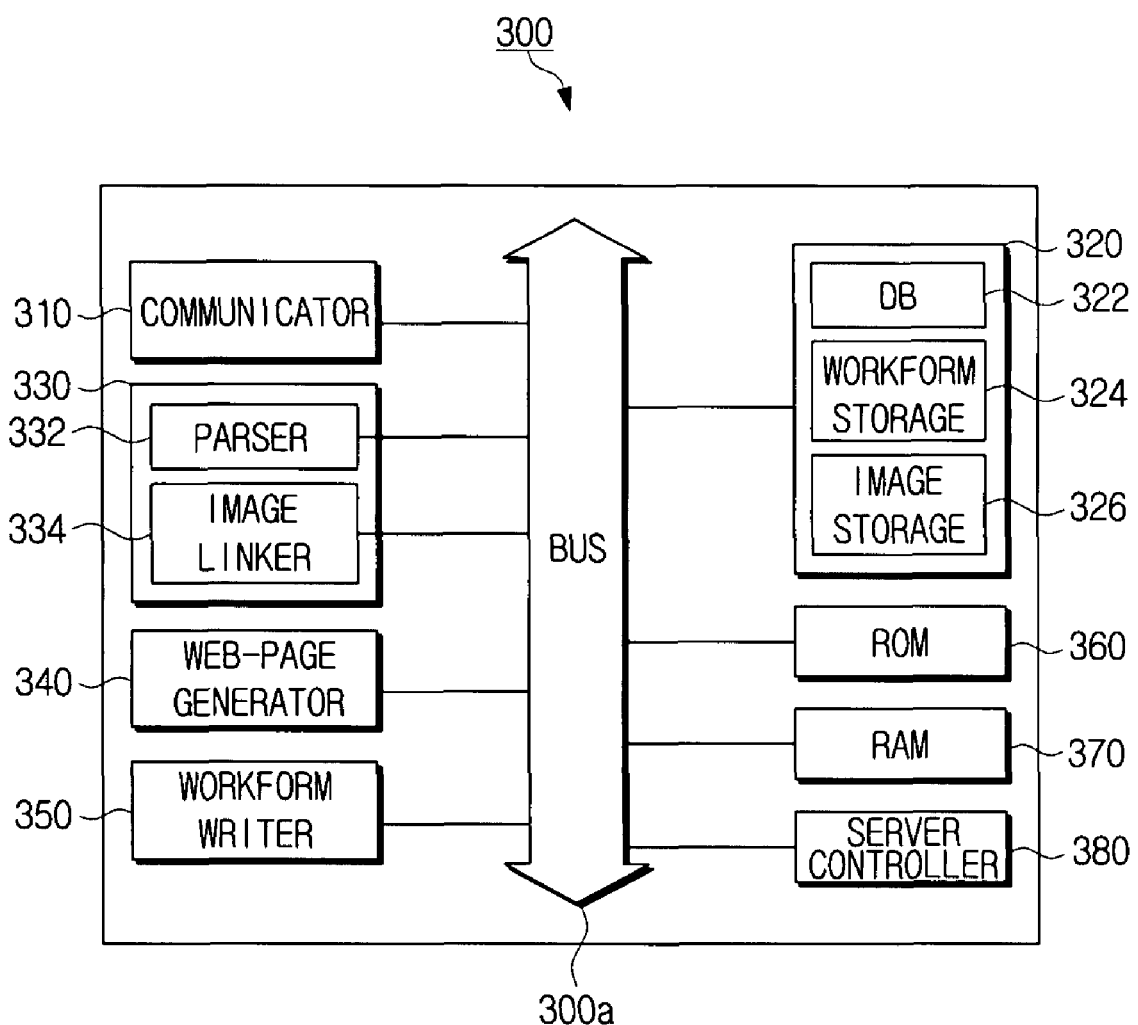
FIG. 4 is a schematic block diagram illustrating a web server illustrated in FIG. 2.

FIG. 4 is a schematic block diagram illustrating an exemplary web server 300 illustrated in FIG. 2, according to an embodiment of the present general inventive concept. Referring to FIGS. 2 through 4, the web server 300 may include a communicator 310, a storage unit 320, a workform processor 330, a web-page generator 340, a workform writer 350, a ROM 360, a RAM 370, and a server controller 380. A bus 300a may also be included to provide a path through which data is transmitted and/or received among the above blocks.

The communicator 310 may be connected to the user terminal 100 and the device 200 through the communication network 10 to communicate with the user terminal 100 and the device 200, to receive an ID and a password of a user from the user terminal 100 or the device 200, and to provide the ID and password to the server controller 380. The communicator 310 transmits a web-page related to writing of a new workform or editing of a pre-written workform to the user terminal 100 and a workform selected by the user to the device 200. The device 200 performs a work based on the transmitted workform.

The storage unit 320 may store data necessary to generate web-pages related to workforms, i.e., a plurality of images and a plurality of workform documents. For this purpose, the storage unit 320 may include a database (DB) 322, a workform storage 324, and an image storage 326.

The DB 322 stores attribute values of attributes, which can be supported and provided by the device 200, at least one by one. For example, if the device 200 supports attribute values "A4," "A3," "B4," and "B3" for an attribute "paper size" of attributes which can be supported by the device 200, the DB 322 stores the attribute values of "A4," "A3," "B4," and "B3" of the attribute "paper size."

The attribute values stored in the DB 322 can be periodically provided from the device 200 and thus updated. In other words, the communicator 310 can be periodically connected to the device 200 to receive attribute values of each of the attributes, and the server controller 380 can update the stored attribute values in the DB 322.

The DB 322 can also store XML format data, text data, and images, such as "▼," necessary to generate the web-pages.

The workform storage 324 stores at least one workform document as illustrated in FIG. 5, wherein at least one workform document is written for each user through the web-pages. The workforms stored in the workform storage 324 are used to show workforms pre-set by the user who has logged into the web server 300, and workforms edited or added by the user can be stored in the workform storage 324.

The image storage 326 stores a plurality of images necessary to generate web-pages. The plurality of images can be stored using a plug-in method. For example, the plug-in method can be used to expand functions of a web browser and provide various types of information including sounds, still pictures, moving pictures, etc.

The workform processor 330 processes the stored workforms as displayable signals during a request for web-pages to write workforms. For this purpose, the workform processor 330 can include a parser 332 and an image linker 334.

If the user terminal 100 performs an authentication process and requests to display the web-pages to write the workforms, the parser 332 parses the XML format web-page data stored in the DB 322 or the workform documents stored in the workform storage 324 and outputs a parsed workform document.

The image linker 334 links a portion of the parsed workform document, which is required to be converted into an image, with the images stored in the image storage 326. For example, portions of the parsed workform document related to upper menus such as "Scan," "Fax," "E-mail," and "OCR" must be displayed as images not texts. Thus, the image linker 334 reads images respectively corresponding to the upper menus from the image storage 326 and links the portions with the read images.

The web-page generator 340 generates web-pages related to the web server 300. In more detail, the web-page generator 340 generates an initial web-page (not illustrated) through which the user terminal 100 logs into the web server 300 and workform web-pages as illustrated in FIGS. 6A through 6D, wherein the workform web-pages are necessary to write or edit workforms, and to transmit the generated web-pages to the user terminal 100 used by a user who has logged into the web server 300.

In particular, the web-page generator 340 generates web-pages to display the images stored in the image storage 326, wherein the web-pages are necessary to write new workforms as illustrated in FIGS. 6A through 6D. In particular, the web-page generator 340 generates web-pages including designated areas to display the images linked by the image linker 334.

If a plurality of images are included in a web-page and transmitted to the user terminal 100, the web-page generator 340 generates the plurality of images in a format, such as, a Java Script format, and the other area of the web-page in a general web language, such as, a hypertext markup language (HTML). This can be done to display the web-page on the user terminal 100 and drag and drop each of the images without installing additional software in the user terminal 100.

FIGS. 6A through 6D are views illustrating a process to write a new workform through workform web-pages displayed on the display 120 illustrated in FIG. 3.

Figure 6A:
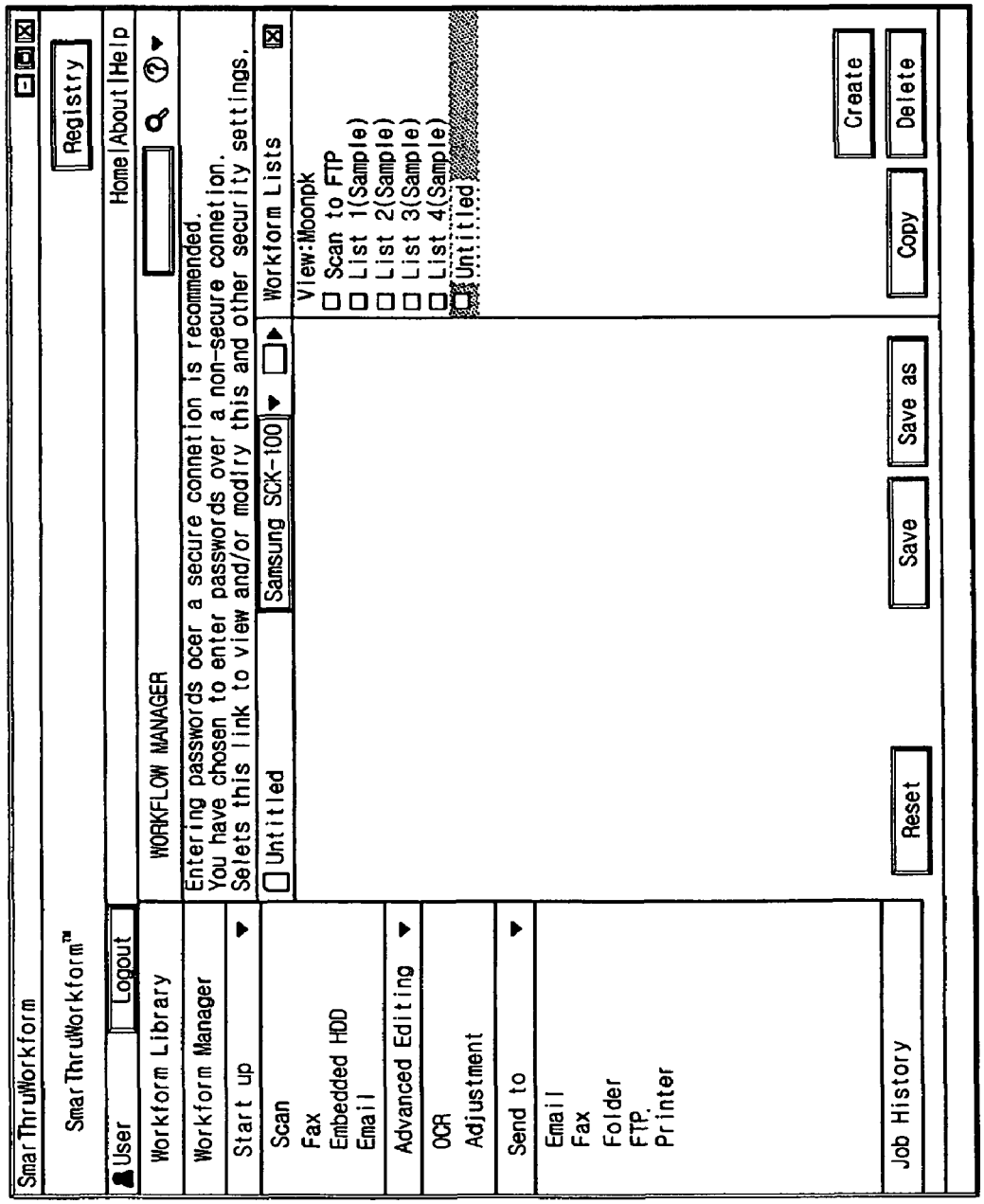
FIGS. 6A through 6D are views illustrating a process to write a new workform through workform web-pages displayed on a display illustrated in FIG. 3.

If an authentication of a user is performed through an initial web-page, the web-page generator 340 generates a basic web-page which does not display portions related to a workform as illustrated in FIG. 6A. Here, the parser 332 receives an XML document corresponding to the basic web-page from the ROM 360 and parses the XML document, and the image linker 334 links portions of the parsed XML document, which are required to be linked with images, with images. The web-page generator 340 generates the basic web-page to display the linked images using data output from the image linker 334.

Figure 6B:
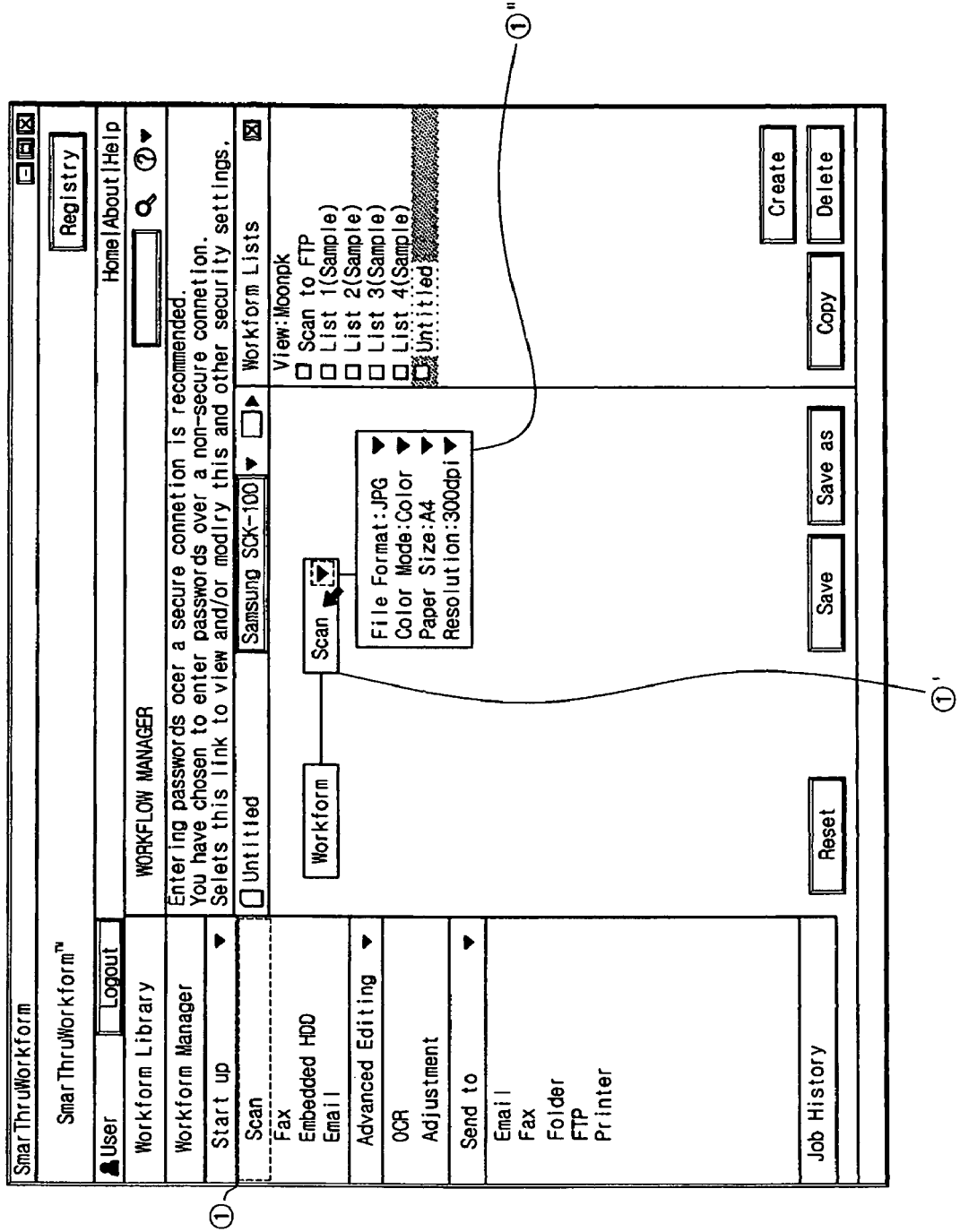

If writing of a new workform is requested through the user input unit 110 on the basic web-page displayed on the user terminal 10, and then an image (e.g., "scan" ①) is selected, the web-page generator 340 generates a first web-page as illustrated in FIG. 6B using the web-page data stored in the DB 322. Referring to FIG. 6B, if an upper menu "scan ▼" ①'0 corresponding to the selected image "scan" ① is displayed, and "▼" as illustrated in a dotted line is selected through the user input unit 110, the web-page generator 340 generates the first web-page to display lower menus ①'' of "scan." Here, for example, letters illustrated in the upper menu ①' and the lower menus ①'' are texts, and "▼" are images.

If a user manipulates the user input unit 110 to select "▼" displayed for each of attributes of the lower menus ①'', attribute values of each attribute, which can be supported by the device 200, may be displayed in a second web-page, and thus the user may select a desired attribute value through the user input unit 110.

Figure 6C:
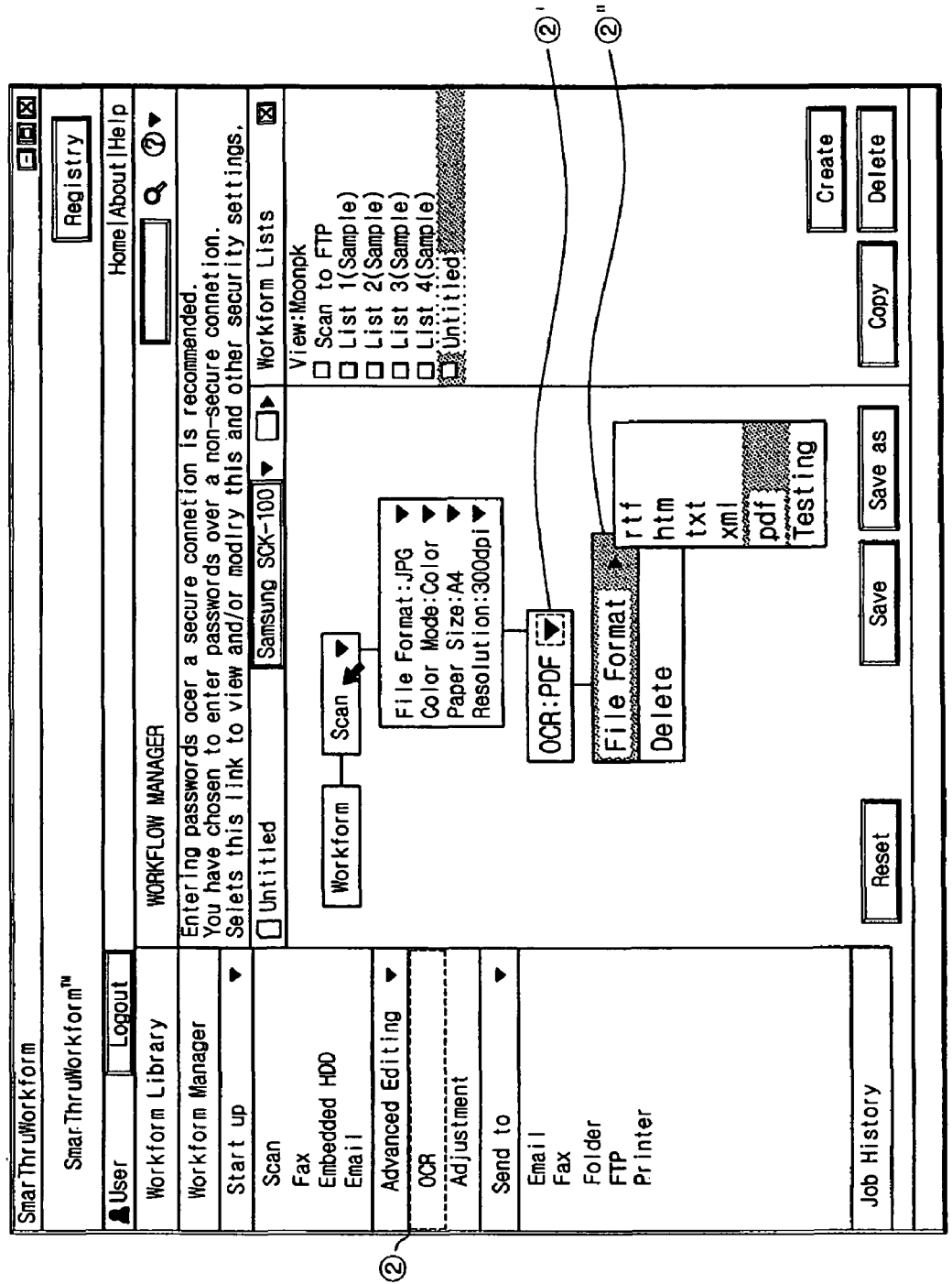
Figure 6D:
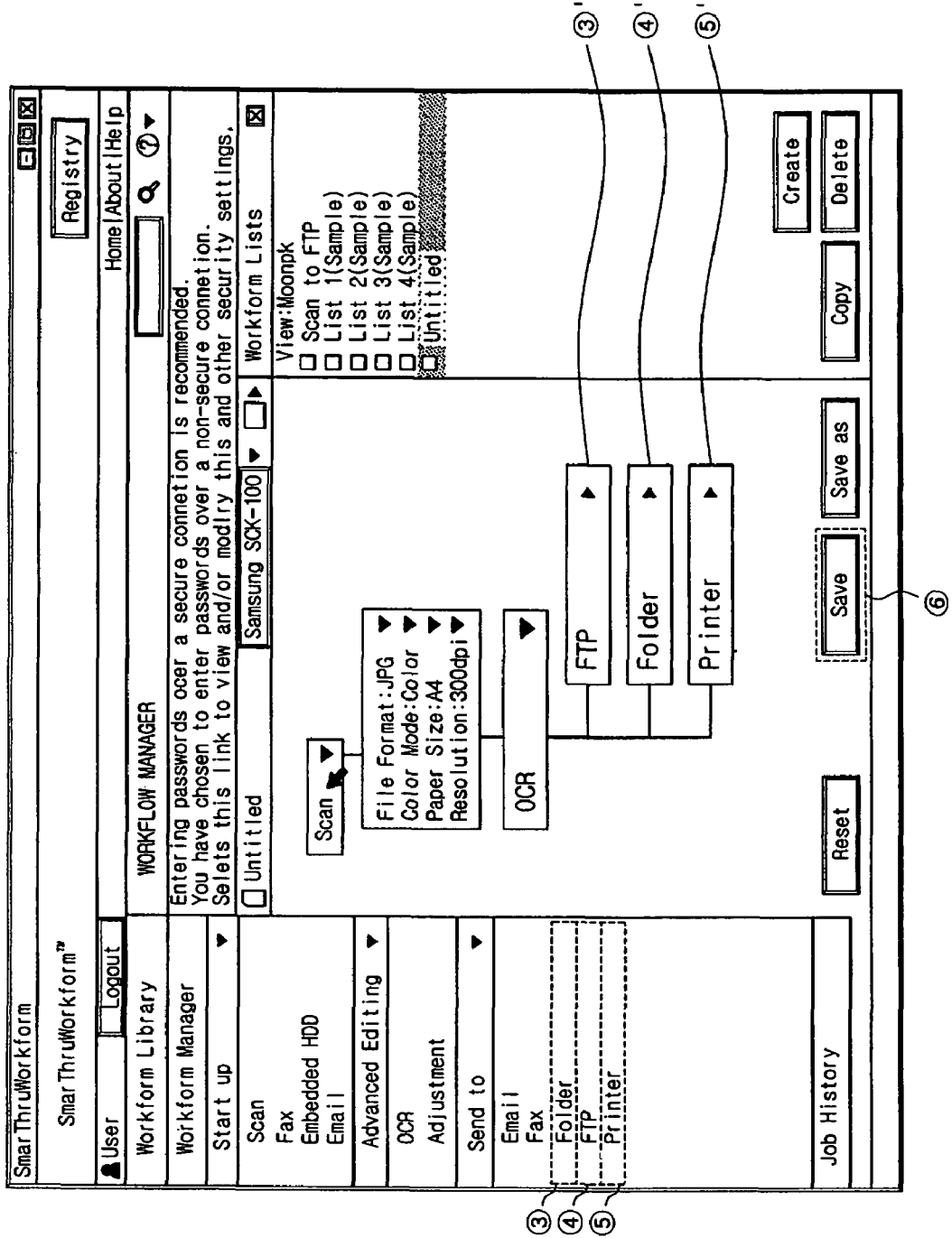

If attribute values of each of the attributes displayed in the lower menus "①''" are completely set, and then a next step image (e.g., "OCR" ②) is selected through the user input unit 110, the web-page generator 340 generates the second web-page as illustrated in FIG. 6C. Referring to FIG. 6C, if an upper menu "OCR:PDF ▼" ②' corresponding to the selected next step image "OCR" ② is displayed and "▼," illustrated in a dotted line, is selected through the user input unit 110, the web-page generator 340 generates the second web-page to display a lower menu ②'' of the upper menu "OCR:PDF ▼"②'. Here, for example, letters illustrated in the upper menu ②' and the lower menu ②'' are texts, and "▼" and "▶" are images. If attribute values of each of attributes of the lower menu ②'' are completely set, and then next step images (e.g., "Folder" ③), "FTP" ④, and "Printer" ⑤)) are selected through the user input unit 110, the web-page generator 340 generates a third web-page as illustrated in FIG. 6D. Referring to FIG. 6D, the web-page generator 340 generates the third web-page to display upper menus "FTP," "Folder," "Printer" ③', ④', and ⑤' corresponding to the selected next step images "FTP," "Folder," and "Printer" ③, ④, and ⑤. Here, letters illustrated in the selected next step images ③, ④, and ⑤, and the upper menus ③', ④', and ⑤' are texts, and "▼" are images.

If attribute values for all lower menus are completely set through the above-described process, and then a "save" button ⑥ is selected through the user input unit 110, the communicator 160 transmits the set attribute values to the second communicator 310.

Here, the upper and lower menus ①', ①'', ②', ②'', ③', and ④' for "scan," "OCR," "FTP," and "Printer," respectively, are displayed as the attribute values of each of the attributes can be stored in the DB 322. In other words, the basic web-page and the first through third web-pages illustrated in FIGS. 6A through 6D are web-pages to write a new workform. Thus, the web-page generator 340 generates a web-page to display attribute values of each of attributes which can supported by the device 200, wherein the attribute values are stored in the DB 322.

The workform writer 350 writes a new workform document for the device 200 using the attribute values of each of the attributes transmitted from the communicator 160 through the communicator 310. In other words, the written new workform document includes attribute values of each of attributes newly set through the first through third web-pages.

Here, the workform writer 350 writes the new workform document using a designated format language, such as, an XML format.

The web-page generator 340 may generate a web-page to generate a new workform or to edit a pre-written workform.

If the user desires to edit the pre-written workform, the user logs onto a web-page of the web server 300. A workform list pre-set for the user who has logged onto the web server 300 is displayed on the basic web-page. If the user selects a workform the user desires to edit from the workform list (e.g., a first list "List 1" illustrated in FIG. 7), the parser 332 reads the selected workform document from the workform storage 324, parses the read workform document, and provides the parsing results to the web-page generator 340.

Figure 7:
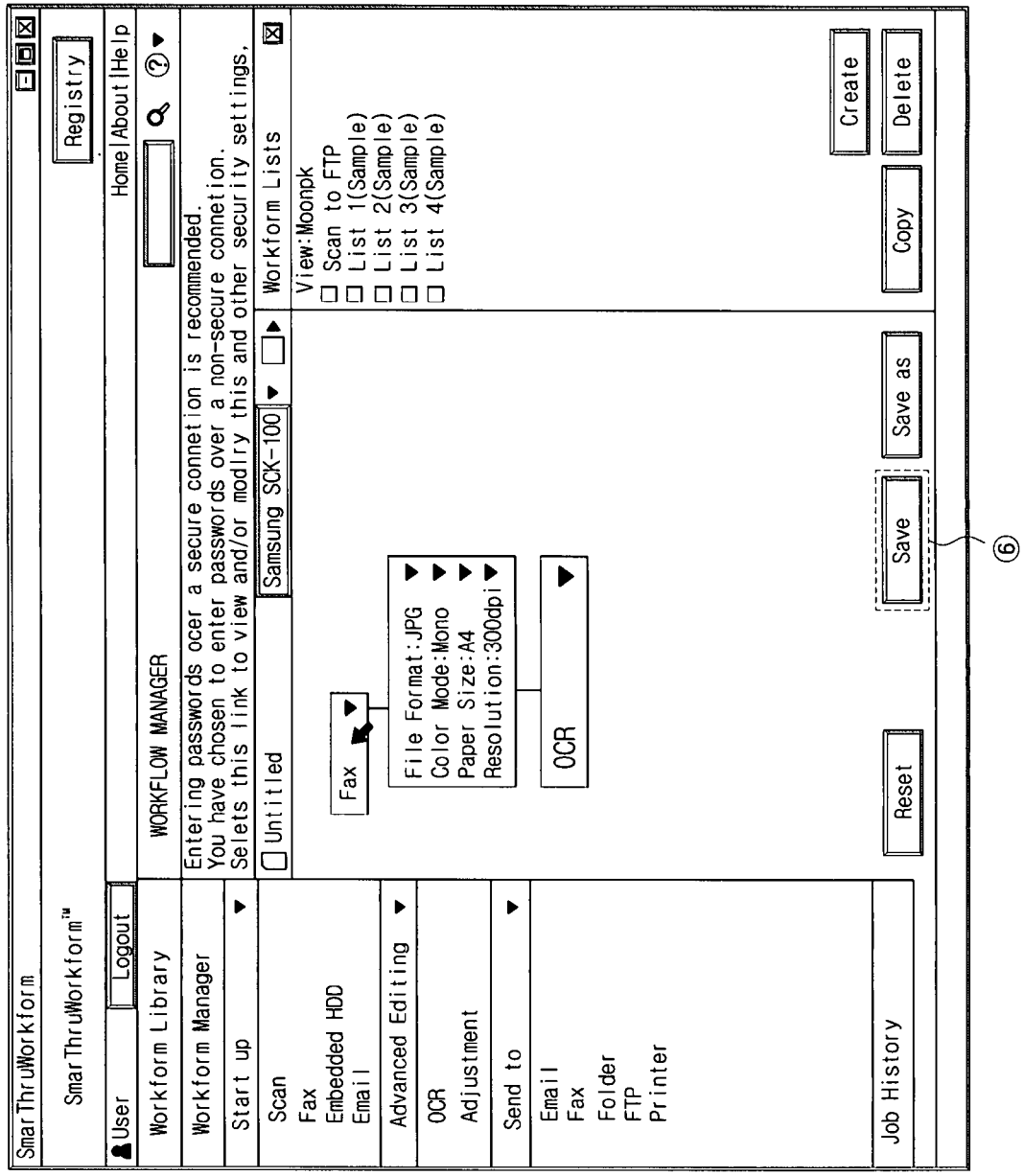
FIG. 7 is a view illustrating a process to edit an existing workform through a workform web-page displayed on the display illustrated in FIG. 3.

The web-page generator 340 generates a web-page to display pre-set attribute values as illustrated in FIG. 7 based on the provided parsing results. Here, the web-page generator 340 generates a web-page to display attributes of each of attributes which can be provided from the device 200, wherein the attribute values are stored in the DB 322.

If the user manipulates the user input unit 110 to change attribute values of an attribute the user desires to edit and select the "save" button ⑥ on the web-page illustrated in FIG. 7, the communicator 160 transmits the attributes including the changed attribute values to the communicator 310.

The workform writer 350 re-writes the pre-written workform using the attribute values of each of the attributes transmitted from the communicator 160. In other words, if the user logs into the web server 300 and then requests writing or editing of a workform through the web-page of the web server 300, the web-page generator 340 generates a web-page related to the workform. If the user requests writing of a new workform including new attribute values through the web-page related to the workforms as illustrated in FIGS. 6A through 6D or editing of a pre-stored workform through the web-page as illustrated in FIG. 7, the workform writer 350 writes an edited workform or a new workform through the web-page. The edited workform or the new workform is stored in the workform storage 324.

The ROM 360 may store various control programs necessary to realize functions of the web server 300, a management program to manage the device 200, software related to plug-in, a program to parse an XML format workform, and software necessary to generate web-pages.

The RAM 370 may store various types of data generated during the operation of the web server 300.

The server controller 380 controls the above-described overall operation of the web server 300 using the various control programs. If logging into the web server 300 is requested from the user input unit 110, the server controller 380 controls the web-page generator 340 and the communicator 310 to generate the initial web page and transmit the initial web-page to the user terminal 100.

In particular, if an image (e.g., "scan" ① illustrated in FIG. 6B) is dragged and dropped onto a predetermined area of the first web-page on the basic web-page displayed on the user terminal 100 to write a new workform through a web-page, the server controller 380 controls the web-page generator 340 to generate the first web-page to display a screen as illustrated in FIG. 6B in the predetermined area.

Here, the server controller 380 controls the web-page generator 340 to read the attribute values of the attributes provided from the device 200 from the DB 322 and generate a web-page to display the read attribute values.

If the attribute values of each of the attributes are completely set through the web-page, the server controller 380 controls the workform writer 350 and the workform storage 324 to write and store a workform document including the set attribute values of each of the attributes.

If editing of the stored workform document is requested, the server generator 380 controls the parser 332 and the web-page generator 340 to parse the stored workform document and to display the parsed workform document on the web-page. If the generated web-page is displayed on the user terminal 100, and then attribute values of the at least one attribute are changed by through a manipulation of the user input unit 110, the server controller 380 controls the workform writer 350 to re-write a workform to reflect the changed attribute values. The re-written workform is stored in the workform storage 324.

Figure 8:
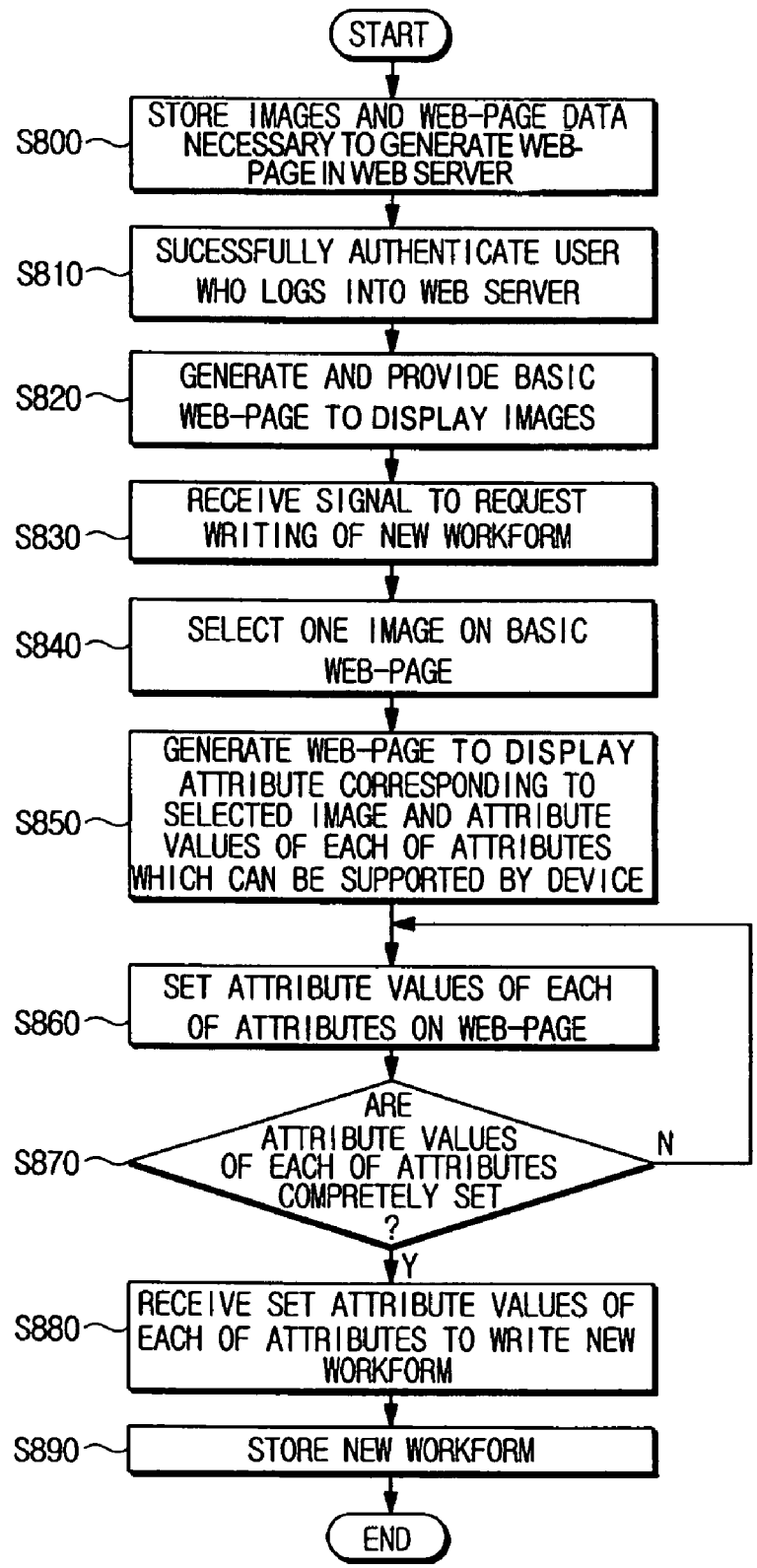
FIG. 8 is a flowchart illustrating a method to provide web-pages to write a new workform to manage a device, according to an embodiment of the present general inventive concept.

FIG. 8 is a flowchart illustrating a method to provide web-pages to write a new workform to manage a device, according to an embodiment of the present general inventive concept. Referring to FIGS. 2 through 8, in operation S800, a manager stores a plurality of images necessary to generate a web-page in the image storage 326 of the web server 300 and web-page data in the ROM 360.

In operation S810, a user of the user terminal 100 connected to the web-server 300 through the communicator 310 and the communication network 10 logs into the web server 300 and thus is successfully authenticated. In operation S820, the web-page generator 340 and the second communicator 310 are controlled by the server controller 380 to generate a basic web-page to display the stored images and transmit the basic web-page to the user terminal 100:.

Thus, a basic web-page as illustrated in FIG. 6A can be displayed on the display 120 of the user terminal 100.

In operation S830, a signal to request writing of a new workform is received through the user input unit 110. In operation S840, one of the images displayed on the basic web-page is selected. In operation S850, the web-page generator 340 generates a first web-page to display at least one attribute corresponding to the selected image and attributes of each of attributes which can be supported by the device 200.

In more detail, if a predetermined image is selected on a basic web-page as illustrated in FIG. 6A, the web-page generator 340 generates a first web-page to display an upper menu corresponding to the selected image and lower menus belonging to the upper menu, i.e., attributes and attribute values of each of the attributes which can be supported by the device 200 as illustrated in FIG. 6B.

In operation S860, a user sets attribute values of each of the attributes on first through third web-pages as described for FIGS. 6A-6D In operation S870, a determination is made as to whether the attribute values of each of the attributes are completely set on a web-page as illustrated in FIG. 6D. If it is determined in operation S870 that the attribute values of each of the attributes are completely set on the web-page, the completely set attribute values are transmitted from the user terminal 100 to the web-server 300.

In operation S880, the workform writer 350 writes a new workform using the transmitted attribute values of each of the attributes. In operation S890, the workform storage 324 stores the new workform. In other words, in operation S890, the new workform is stored to be mapped to the user successfully authenticated in operation S810. The stored new workform may be edited by the user of the user terminal 100 or the manager of the web server 300.

Meanwhile, in operation S840, the user may manipulate the user input unit 110 to drag and drop the selected image into a predetermined area of the web-page. In this case, a web-page as illustrated in FIG. 6B may be displayed on the display 120 of the user terminal 100.

Figure 9:
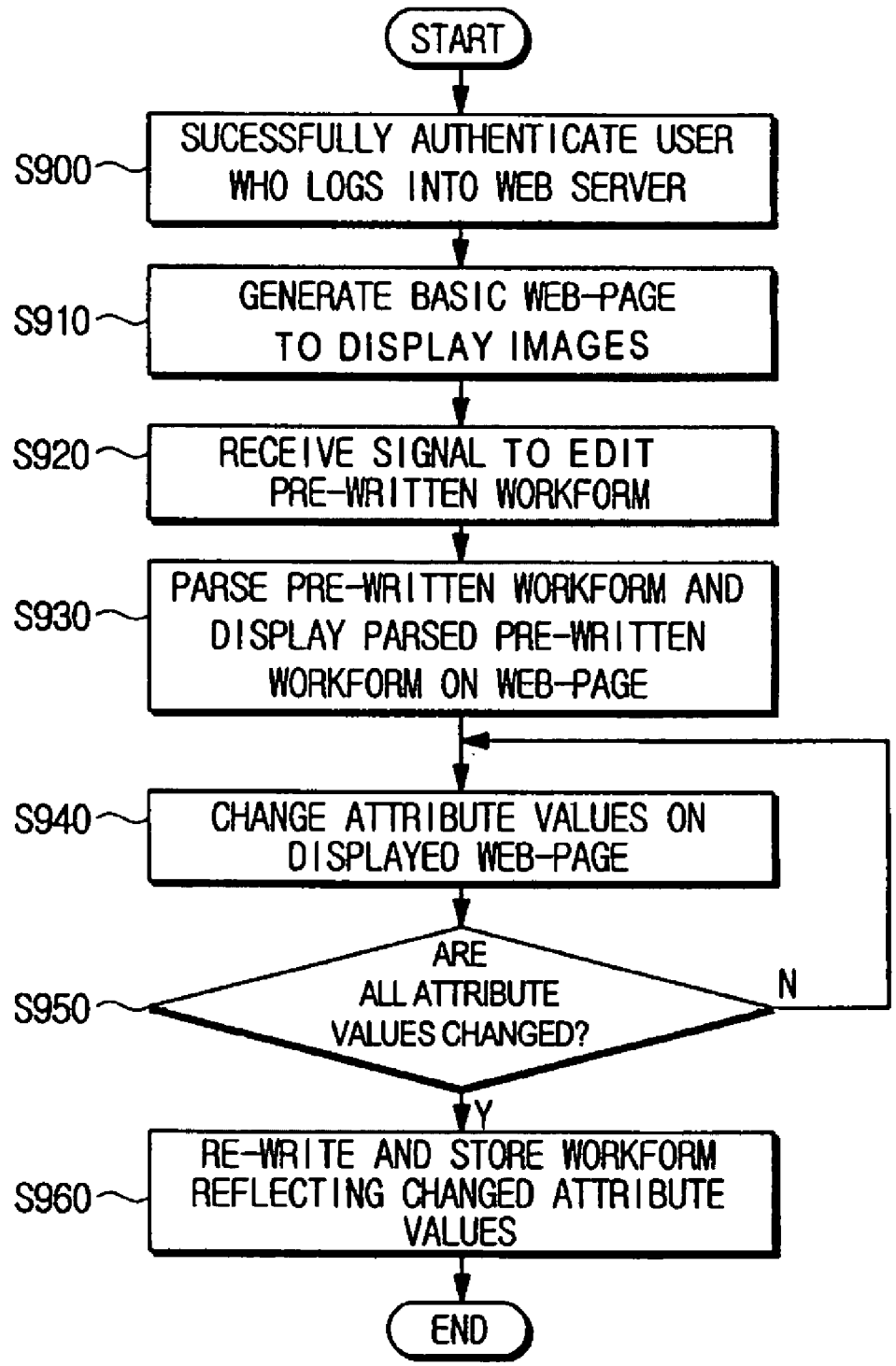
FIG. 9 is a flowchart illustrating a method to provide web-pages to edit a workform written to manage a device, according to an embodiment of the present general inventive concept.

FIG. 9 is a flowchart illustrating a method to provide web-pages to edit a workform written to manage a device, according to an embodiment of the present general inventive concept. Referring to FIGS. 2 through 9, in operation S900, a user drives the web browser 130 of the user terminal 100 to log into the web server 300 and then is successfully authenticated. In operation S910, the web-page generator 340 and the second communicator 310 generate a basic web-page as illustrated in FIG. 6A and transmit the basic web-page to the user terminal 100. Thus, the basic web-page as illustrated in FIG. 6A is displayed on the display 120 of the user terminal 100.

In operation S920, a signal to request editing of a pre-written workform is received through the user input unit 110. In operation S930, the parser 332 reads the pre-written workform from the workform storage 324 and parses the read pre-written workform, and the web-page generator 340 generates a web-page to display the parsed pre-written workform.

The generated web-page is displayed on the display 120 of the user terminal 100 as illustrated in FIG. 7. In operation S940, attribute values of the at least one attribute are changed on the displayed web-page through a manipulation of the user input unit 110. In operation S950, a determination is made as to whether all of the attribute values desired by a user are completely changed. If it is determined in operation S950 that all of the attribute values desired by the user are completely changed, the workform writer 350 re-writes and stores a workform reflecting the changed attribute values, and the workform storage 324 stores the re-written workform in operation S960.

Various embodiments of the present general inventive concept can be embodied as computer readable codes on a computer readable recording medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, and optical data storage devices. The computer readable recording medium can also be distributed over network coupled computer systems so that the computer readable code is stored and executed in a distributed fashion. Various embodiments of the present general inventive concept may also be embodied in hardware or in a combination of hardware and software.

According to the present general inventive concept, "well formed" can be supported during writing of a workform to write an accurate, correct XML format workform. Here, "well formed" indicates that programming starts with "<>" and ends with "</>." If the workform writer 350 writes a workform, the sever controller 380 may check a validity of the written workform to determine whether an error occurs in the written workform. Thus, in the present general inventive concept, a correct XML format workform may be provided to a user.

As described above, in a web server and a method to provide web-pages to manage devices according to the present general inventive concept, only attributes and attribute values, which can be supported by a device, can be displayed on a web-page applied as an UI screen. Thus, a user can easily write workform.

In particular, an XML format workform can be edited using a graphic image, such as, a web-page, and attribute values of each of the attributes can be supported on-line. Thus, a user does not need to directly input texts.

Also, the attributes and the attribute values, which can be supported by the device, can be periodically provided from the device to the web server and thus updated. Thus, the user can be provided with updated information.

Also, a general user can write a workform to manage the device through a web-page provided from the web server without specific knowledge related to XML.

In addition, the workform for an overall work of the device can be written through the web-page. Thus, the workform can be written through an Internet without installing an additional program in a PC of the user.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A web server to provide web-pages to manage devices, comprising:
   a storage to store data of a web-page to set attributes and attribute values related to at least one device;
   a web-page generator to generate a basic web-page based on the stored data of the web-page if displaying of the web-page is requested from a user terminal;
   a communicator to transmit the generated basic web-page to the user terminal; and
   a server controller to control the web-page generator to generate a first web-page to display at least one attribute and attribute values of the at least one device on the basic web-page displayed on the user terminal,
   a workform writer to write a new workform comprising the attribute values of each of the attributes which are completely set through the first web-page displayed on the user terminal; and
   a workform storage to store the written new workform.

2. The web server of claim 1, wherein the storage stores the attribute values of each of the attributes, which can be supported by the at least one device, at least one by one, and the web-page generator generates the first web-page to display the attribute values of each of the attributes stored in the storage, wherein the first web-page displays the attribute values on an each attribute basis.

3. The web server of claim 2, wherein the server controller controls the communicator and the storage to receive the attribute values of each of the attributes from the at least one device and update the stored attribute values.

4. The web server of claim 3, wherein the server controller periodically receives the attribute values of each of the attributes from the at least one device.

5. The web server of claim 1, further comprising a parser to parse
   the stored new workform if editing of the stored new workform is requested from the user terminal,
   wherein the server controller controls the web-page generator and the communicator to generate a second web-page to display the parsed new workform and provide the second web-page to the user terminal and then if at least one attribute value of the new workform displayed on the user terminal is changed, controls the workform writer to re-write a workform reflecting the changed attribute value.

6. The web server of claim 1, wherein the storage stores an image necessary to generate the web-page using a plug-in method.

7. The web server of claim 1, wherein an image necessary to generate the web-page is written to be dragged and dropped on the web-page displayed on the user terminal.

8. The web server of claim 1, wherein the new workform is written in an XML (eXtensible Markup Language) format.

9. A method of providing web-pages to manage devices, comprising:
   storing data of a web-page to set attributes and attribute values related to at least one device in a web server;
   generating a basic web-page based on the stored data of the web-page if displaying of the web-page is requested from a user terminal;
   transmitting the generated basic web-page to the user terminal;
   generating a first web-page to display at least one attribute and attribute values of the at least one device on the basic web-page displayed on the user terminal; and
   writing a new workform comprising the set attribute values of each of the attributes if the attribute values of each of the attributes are set through the first web-page displayed on the user terminal.

10. The method of claim 9, wherein the first web-page to display the attribute values of each of the attributes, which can be supported by the at least one device, is generated.

11. The method of claim 10, wherein the attribute values of each of the attributes are periodically provided from the at least one device.

12. The method of claim 9, further comprising:
    storing the written new workform.

13. The method of claim 12, further comprising:
    parsing the stored new workform if editing of the new workform is requested from the user terminal; and
    generating a second web-page to display the parsed new workform and providing the second web-page to the user terminal.

14. The method of claim 13, further comprising: re-writing a workform to reflect the changed attribute value if the second web-page is displayed on the user terminal, and then at least one attribute value of the new workform is changed on the second web-page.

15. The method of claim 9, wherein the storage store an image necessary to generate the web-page using a plug-in method.

16. The method of claim 9, wherein an image necessary to generate the web-page is written to be dragged and dropped on the web-page displayed on the user terminal.

17. The method of claim 9, wherein the new workform is written in an XML format.

18. A method to generate user interfaces from a server to manage a plurality of devices, the method comprising:
    storing attribute data and attribute values of each of the plurality of devices and workforms corresponding to the attribute data and attribute values in the server;
    generating a basic user interface to display the stored data and transmitting the basic user interface to a user terminal;
    generating a first user interface to display at least one attribute and corresponding attribute values and to request one of a signal to set the at least one attribute and corresponding attribute values and a signal to edit the workforms corresponding to the at least one attribute data and corresponding attribute values; and
    writing a new workform comprising the set of attribute values of each of the attributes if the attribute values of each of the attributes are set through the first user interface,
    wherein the user interface is a web-page.

19. The method of claim 18, further comprising:
editing the workform corresponding to at least one attribute and corresponding attribute values and storing the editing workform if the signal is to edit the workform;
parsing the stored edited workform; and
generating a second user interface to display the parsed edited workform.

20. The method of claim 18, further comprising storing the set at least one attribute data and attribute values of the plurality of devices.

21. A web server to manage a plurality of devices, comprising:
a storage unit to store a plurality of attribute and attribute values corresponding to the plurality of devices;
a web-page generator to generate a first webpage to display the stored plurality of attribute and attribute values of at least one of the plurality of devices, and to generate one of a web-page to allow a user to enter attribute values for the at least one of the plurality of devices and a web-page to allow a user to edit the attribute and attribute values corresponding to the at least one of the plurality of devices, and
a workform writer to write a new workform corresponding to the entered attribute values of the web-page; and
a workform storage unit to store the workform.

22. The web server of claim 21, wherein the entered attribute values and/or the edited attribute and attribute values are stored in the storage unit.

23. The web server of claim 21 wherein the storage unit periodically updates the attributes and/or attribute values of the plurality of devices.

24. The web server of claim 21, further comprising:
a workform writer to write a new workform corresponding to the edited attributes and/or attribute values of the web-page; and
a workform storage unit to store the workform.

* * * * *